United States Patent
Yokoyama et al.

[11] Patent Number: 5,954,177
[45] Date of Patent: Sep. 21, 1999

[54] OIL SEAL FOR AUTOMATIC TRANSMISSION

[75] Inventors: Fumitomo Yokoyama; Kazuhisa Ozaki; Masanori Kadotani; Mikio Iwase; Harumichi Tsuboi; Makoto Hijikata, all of Anjo; Yasuo Hojo, Toyota; Atsushi Tabata, Toyota; Yasunori Nakawaki, Toyota; Yasunari Nakamura, Toyota; Nobuaki Takahashi, Toyota; Hideki Miyata, Toyota; Kagenori Fukumura, Toyota; Koji Tsukamoto, Shizuoka-ken, all of Japan

[73] Assignees: Aisin AW Co., Ltd.; Nok Corporation, both of Japan

[21] Appl. No.: 08/997,397

[22] Filed: Dec. 23, 1997

[30] Foreign Application Priority Data

Dec. 25, 1996 [JP] Japan ................................. 8-345537

[51] Int. Cl.[6] ...................... F16D 25/0638; F16H 57/04; F16J 15/16
[52] U.S. Cl. ............................. 192/85 AA; 277/352
[58] Field of Search ............... 192/85 AA, 17 A, 192/18 A, 12 C; 277/352, 353, 402, 557, 572

[56] References Cited

U.S. PATENT DOCUMENTS

| | | | |
|---|---|---|---|
| 2,054,377 | 9/1936 | Havill et al. | 192/104 |
| 4,566,572 | 1/1986 | Flotow et al. | 192/70.12 |
| 4,714,803 | 12/1987 | Lederman | 192/113.34 |
| 5,364,111 | 11/1994 | Wunsch | 277/557 |

*Primary Examiner*—Rodney H. Bonck
*Assistant Examiner*—Tisha D. Waddell
*Attorney, Agent, or Firm*—Lorusso & Loud

[57] ABSTRACT

An oil seal member is compressed between a connecting pipe for supplying oil to an oil chamber of a hydraulic servo and the cylinder drum of the hydraulic servo. The cylinder drum has an interior oil chamber and turns through a predetermined angle upon operation of a frictional engagement element by the hydraulic servo. The end of the seal member pressed against the cylindrical drum surrounds an oil hole 73 formed in the cylindrical drum, and oil pressure is supplied to the oil chamber through an oil passage in which the seal member is mounted and through the oil hole. A recess is formed in the outer surface of the cylindrical drum around the oil hole and the end of the seal member is received in the recess. When the cylindrical member turns within the predetermined angular range, the end of the seal member is protected by the recess. As a result, the end of the seal member is not damaged and the integrity of the seal is protected.

20 Claims, 6 Drawing Sheets

OIL SEAL FOR AUTOMATIC TRANSMISSION

BACKGROUND OF THE INVENTION

This invention relates to an oil seal structure in an automatic transmission.

In an automatic transmission, rotation generated by an engine is transmitted by way of a torque converter to a speed-changer, changed in speed in the speed-changer, and transmitted to drive wheels. The speed changer includes a number of gear elements and a number of different speed stages are achieved by selectively engaging and disengaging frictional engagement elements, such as clutches and brakes, which control rotation of the gear elements.

A brake is used to stop the rotation of a rotary gear element, and has one set of plates (outer plates) splined to the case of the automatic transmission, and another set of plates (inner plates) inter-leaved with the outer plates and connected to the rotary gear element through a splined connection. A hydraulic servo operates to engage the brake by pressing the outer plates and the inner plates together.

Figure 2:
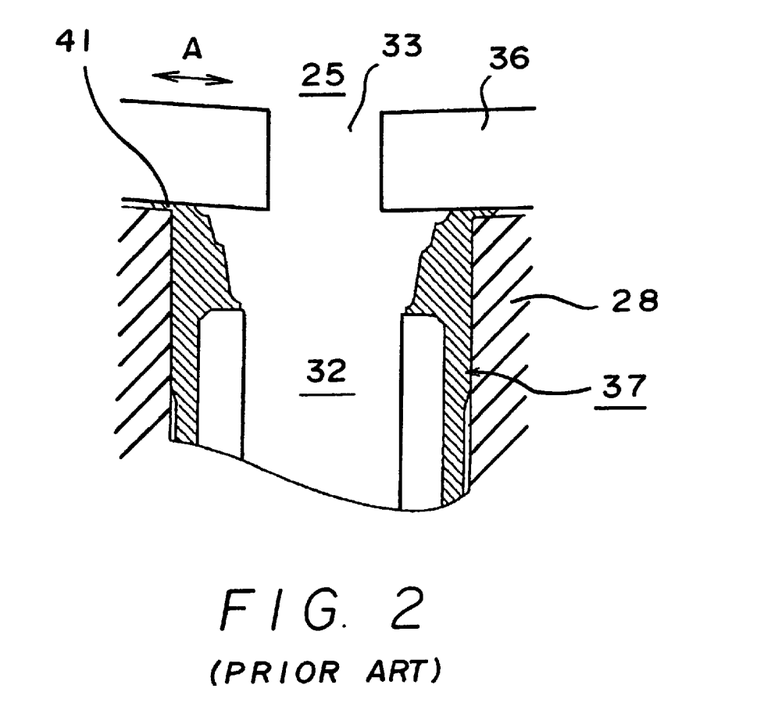
FIG. 2 is an enlarged view of a conventional seal member.
Figure 3:
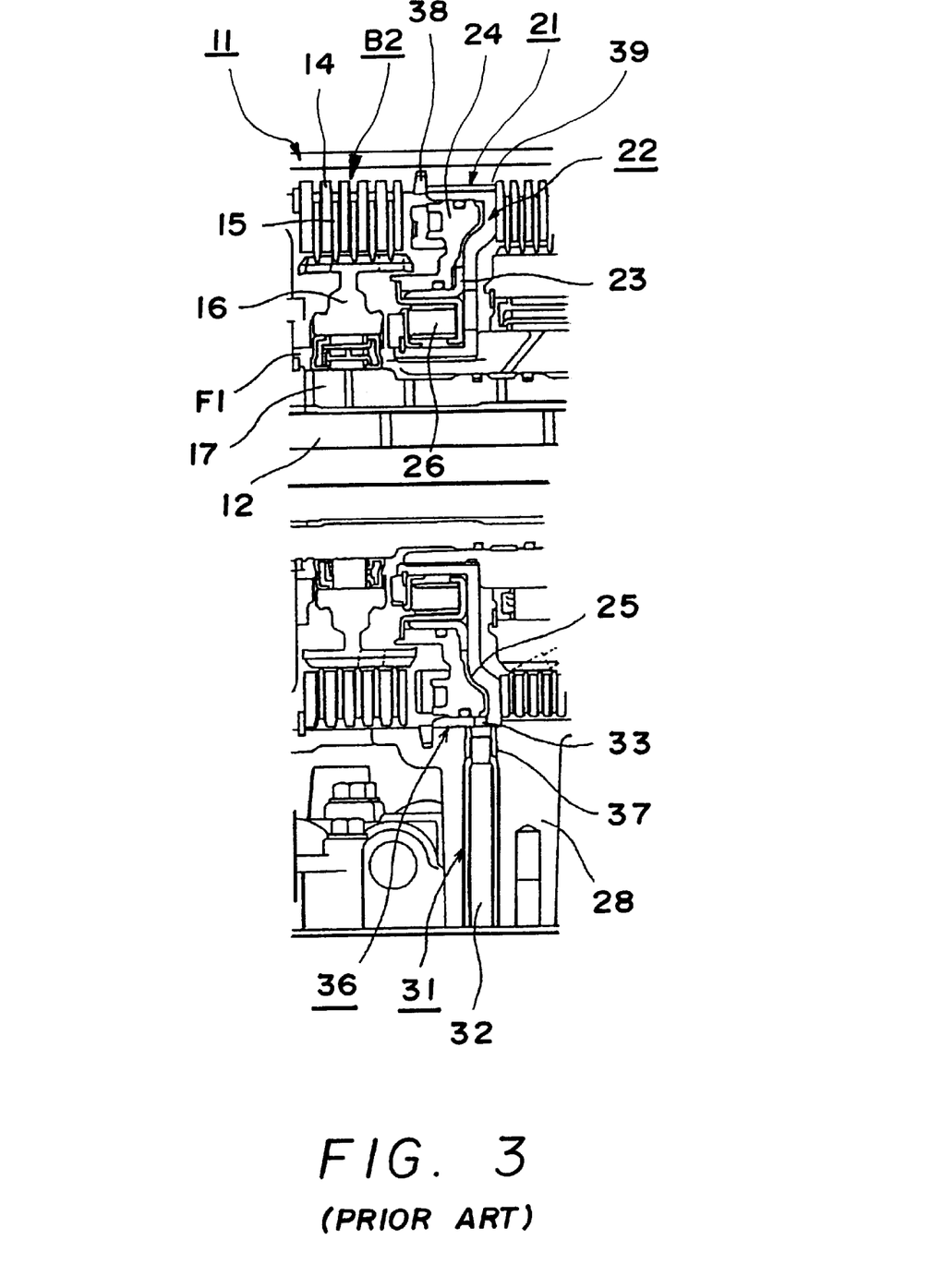
FIG. 3 is a sectional view of a portion of a conventional automatic transmission.

FIG. 2 is an enlarged view of a conventional seal, and FIG. 3 is a sectional view of a portion of a conventional automatic transmission. In FIG. 3, B2 is a second brake; F1 is a one-way clutch; 11 is an automatic transmission case; 12 is an output shaft; 16 is a brake hub, which is a rotary member constituting the outer race of the one-way clutch F1; and 17 is a sun gear shaft constituting the inner race of the one-way clutch F1.

The second brake B2 has a plurality of outer side thin plates 14 splined to the automatic transmission case 11, a plurality of inner side thin plates 15 disposed facing the outer side thin plates 14 and splined to the brake hub 16, and a hydraulic servo 21 for pressing the outer side thin plates 14 and the inner side thin plates 15 together. The hydraulic servo 21 is made up of an outer drum 22 having a C-shaped cross-section, an inner drum 23 fixed to the outer drum 22, a piston 24 slidably disposed between the outer drum 22 and the inner drum 23, and a return spring 26 for retracting the piston 24. The outer drum 22 is fixed in the automatic transmission case 11 through its peripheral component 36 which at one end abuts a snap ring 38 fixed to the automatic transmission case 11 and at its other end abuts a step 39 formed in the automatic transmission case 11. The outer drum 22 and the inner drum 23 together form the cylinder of the hydraulic servo 21.

An oil chamber 25 is formed between the outer drum 22, the inner drum 23 and the piston 24, and when oil is supplied into the oil chamber 25 the piston 24 is made to advance (move to the left in FIG. 3) to press together the outer side thin plates 14 and the inner side thin plates 15 and to thereby create a frictional force which serves to stop rotation of the inner side thin plates 15. In this way, the second brake B2 is engaged.

On the other hand, when oil is drained from the oil chamber 25, the piston 24 is caused by the urging force of the return spring 26 to retract (move to the right in FIG. 3) and the outer side thin plates 14 and the inner side thin plates 15 move apart. In this way, the second brake B2 is released.

A cylindrical connecting pipe 31 is disposed in a wall 28 of the automatic transmission case 11 to provide fluid communication between an oil hole 33 formed in the outer peripheral component 36 of the outer drum 22, and an oil passage 32 in this connecting pipe 31. Oil from a valve body (not shown) is supplied to the oil chamber 25 through the oil passage 32 and the oil hole 33.

Also, so that oil supplied through the oil passage 32 does not leak from between the connecting pipe 31 and the outer peripheral component 36, a cylindrical rubber seal member 37 is disposed abutting the end of the connecting pipe 31. Because the connecting pipe 31 being pressed against the outer peripheral component 36 through the seal member 37, the seal member 37 is compressed and a seal is formed owing to the elasticity of the seal member 37 (see Japanese Unexamined Patent Publication No. S.61-41058).

However, in the conventional automatic transmission described above, when it is necessary to axially extend the outer peripheral component 36 of the outer drum 22 along the inner surface of the automatic transmission case 11 to allow the outer side thin plates 14 to be splined to the outer peripheral component 36, the outer drum 22 functions to receive the reaction force arising on engagement of the second brake B2 as well as functioning as part of the hydraulic servo 21. Consequently, along with engagement and disengagement of the second brake B2, the outer drum 22 moves slightly, within a predetermined range, in the circumferential direction.

FIG. 2 shows the wall 28 of the automatic transmission case 11 (FIG. 3), the oil passage 32, the oil hole 33, the outer peripheral component 36 of the outer drum 22, and the seal member 37. Oil from the valve body (not shown) is supplied into the oil chamber 25 through the oil passage 32 and the oil hole 33. When the outer drum 22 moves slightly in the direction of the arrow A, with engagement and disengagement of the second brake B2, a tip portion 41 of the seal member 37 sometimes enters the gap between the wall part 28 and the outer peripheral part 36 and suffers damage.

SUMMARY OF THE INVENTION

It is therefore an object of the present invention to solve the problem described above and to provide an oil seal of increased quality between a connecting pipe for supplying oil to an oil chamber of a hydraulic servo and the cylinder drum of the hydraulic servo.

To achieve the above and other objects, the invention provides an oil seal for an automatic transmission comprising a cylindrical member which contains an oil chamber and which turns circumferentially within a predetermined range. The oil seal of the present invention is a cylindrical seal member pressed against the cylindrical member and disposed with one end received within a recess which is formed in the outer cylindrical surface of the cylindrical member around the oil hole. Oil pressure supply means supplies oil to the oil chamber through an oil passage which runs through the seal member and through the oil hole.

In a preferred embodiment, the outer circumferential surface of the seal member is pressed against the inner circumferential surface of the recess by the oil pressure inside the oil passage.

In other preferred embodiments of oil seal of the invention, the cylindrical member is a cylinder drum of a hydraulic servo for engaging and disengaging a frictional engagement element, the oil pressure supplying means is a component of a hydraulic control circuit, the oil passage is formed in an automatic transmission case, and the seal member is located in the oil passage with one end abutting the outer surface of the cylinder drum and an opposite end abutting a connecting pipe disposed inside the oil passage.

The cylindrical member defines an interior oil chamber and turns within a predetermined range of its circumference under a force, e.g. from engagement and disengagement of a frictional engagement element where the cylindrical member is part of a hydraulic servo for operating same.

In another preferred embodiment, a tapered surface is formed on the outer periphery at one end of the seal member and a reinforcing member is disposed around the inner periphery of the seal member in a position recessed a set distance from that one end of the seal member.

In yet another preferred oil seal of the invention, the seal member is urged toward the cylindrical member, e.g. servo cylinder, by a spring disposed inside the oil passage.

In still another embodiment of the oil seal of the invention, a lip is formed on the exterior of the end of the oil seal member opposite the cylindrical member, which lip forms a seal with the oil passage and a pressure-receiving surface is formed on the interior of the oil seal member, opposing the lip, whereby pressure within the oil passage, acting on the pressure-receiving surface, enhances the seal.

In other preferred embodiments, a recess is formed in the outer cylindrical surface of the cylindrical member around the oil hole and an end of the seal member is received in the recess.

Preferably, in those embodiments inclusive of a reinforcing member, the radially innermost end of the reinforcing member is positioned radially outward of the outer surface of the servo cylinder.

DETAILED DESCRIPTION OF THE PREFERRED EMBODIMENTS

Preferred embodiments of the invention will now be described in detail with reference to the accompanying drawings.

Figure 4:
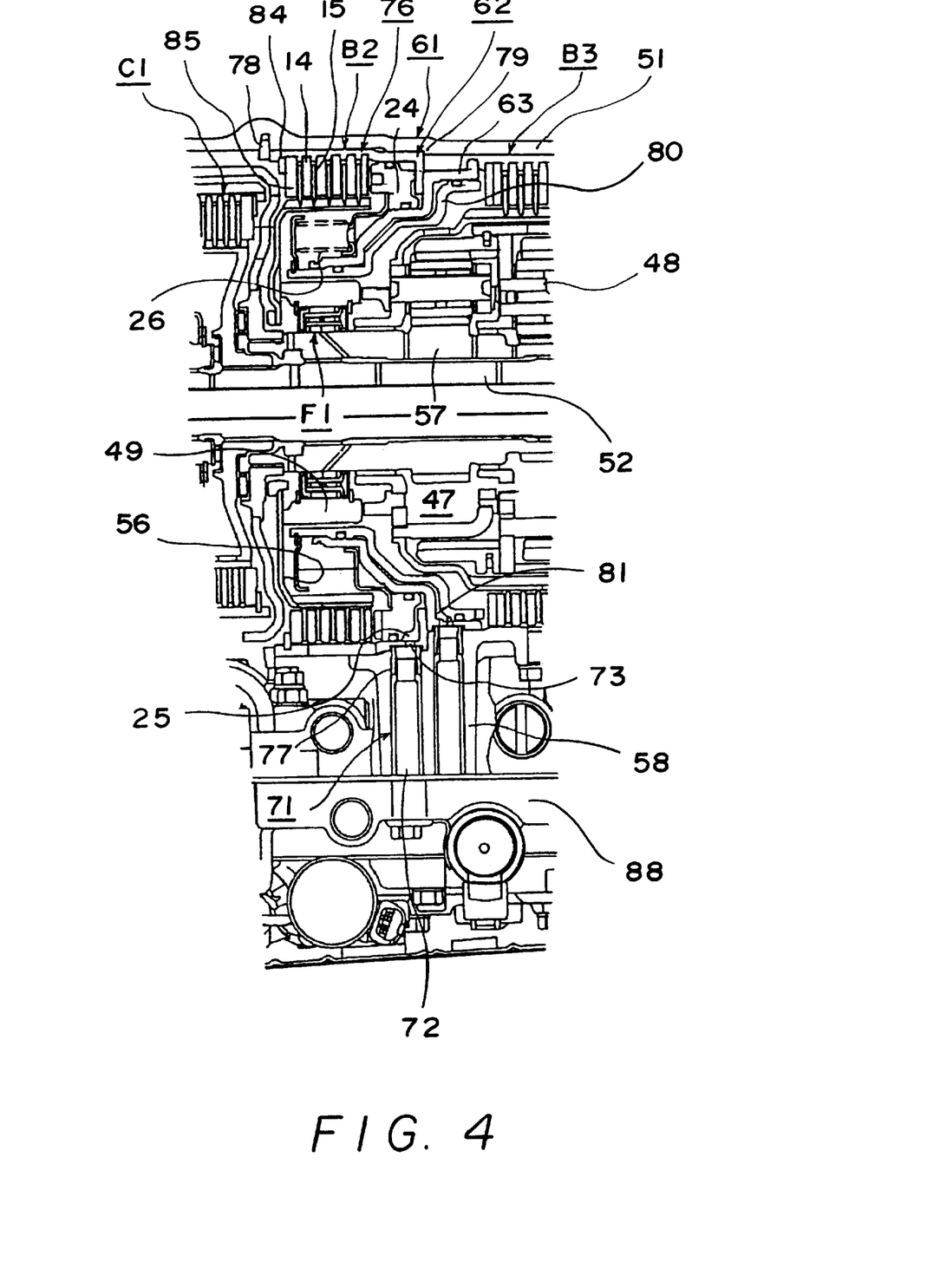
FIG. 4 is a sectional view of a portion of an automatic transmission showing the oil seal of the first embodiment in place.

Referring to FIG. 4, B2 is a second brake; B3 is a third brake; C1 is a first clutch; F1 is a one-way clutch; 47 and 48 are planetary gear units; 51 is an automatic transmission case; 52 is an intermediate transmission shaft; 49 is the outer race of the one-way clutch F1; 56 is a brake hub fixed to outer race 49; and 57 is a sun gear constituting the inner race of the one-way clutch F1.

The second brake B2 has a plurality of outer side thin plates 14 splined to the automatic transmission case 51 and a plurality of inner side thin plates 15 disposed facing the outer side thin plates 14 and splined to the brake hub 56. A hydraulic servo 61 presses the outer side thin plates 14 and the inner side thin plates 15 together for engagement of second brake B2. The hydraulic servo 61 is made up of an outer drum 62 having an L-shaped cross-section, an inner drum 63 fixed to the outer drum 62, a piston 24 slidably disposed between the outer drum 62 and the inner drum 63, and a return spring 26 for retracting the piston 24. The outer drum 62 is fixed in the automatic transmission case 51 through an outer peripheral component 76 having one end abutting a snap ring 78 fixed to the automatic transmission case 51 and its other end abutting a shoulder (step) 79 formed in the automatic transmission case 51.

The outer drum 62 and the inner drum 63 together form the cylinder of the hydraulic servo 21.

An oil chamber 25 is formed between the outer drum 62, the inner drum 63 and the piston 24 and, when oil is supplied into the oil chamber 25, the piston 24 is advanced (moved to the left in FIG. 4), the outer side thin plates 14 and the inner side thin plates 15 are pushed against each other, and a frictional force created which stops rotation of the inner side thin plates 15. In this way, the second brake B2 is engaged.

On the other hand, when oil is drained from the oil chamber 25, the piston 24 is retracted by the return spring 26 (moved to the right in FIG. 4) and the outer side thin plates 14 and the inner side thin plates 15 move apart. In this way, the second brake B2 is disengaged.

A cylindrical connecting pipe 71 is disposed in a wall 58 of the automatic transmission case 51 with its one end surrounding an oil hole 73 formed in the outer peripheral component 76 of the outer drum 62, and an oil passage 72 is formed in this connecting pipe 71. Oil from a valve body 88, which provides a hydraulic control circuit, is supplied to the oil chamber 25 through the oil passage 72 and the oil hole 73.

So that oil supplied through the oil passage 72 does not leak from between the connecting pipe 71 and the outer peripheral component 76, a cylindrical rubber seal member 77 is disposed at the end of the connecting pipe 71 to seal the gap between the connecting pipe 71 and the outer component 76. The connecting pipe 71 is pressed against the outer peripheral component 76 with a predetermined pressing force, through the seal member 77, causing the seal member to deform and seal owing to its elasticity.

In order to reduce the axial direction dimension of the automatic transmission case 51, the third brake B3 is disposed adjacent to the second brake B2, the inner drum 63 is used as the servo cylinder, a piston 80 is slidably disposed inside the inner drum 63, and an oil chamber 81 is formed between the inner drum 63 and the piston 80. In this case, when oil is supplied into the oil chamber 81 and the piston 80 is advanced (moved to the right in the figure) to engage the third brake B3, a reaction force acts on the inner drum 63 toward the left in the figure. For this reason, the outer peripheral component 76 is extended along the inner surface of the automatic transmission case 51 with one end thereof abutting the snap ring 78, as described above. As a result, the reaction force created by engagement of the third brake B3 is borne by the automatic transmission case 51 by way of the snap ring 78.

If the outer peripheral component 76 is extended to surround the second brake B2 and splined to the outer side thin plates 14, when the second brake B2 is engaged, a reaction force acts on the outer side thin plates 14 and the inner side thin plates 15 toward the left in the figure. For this reason, a snap ring 84 is disposed at the front end of the outer peripheral component 76 and the outer side thin plates 14 and the inner side thin plates 15 push against the snap ring 84 through a support plate 85. As a result, the reaction force created by engagement of the second brake B2 is received by the outer drum 62 by way of the snap ring 84. Thus, the outer drum 62 functions as a member for receiving the reaction force created by engagement of the second brake B2 as well as functioning as part of the hydraulic servo 61. Therefore, in engagement and disengagement of the second brake B2, the outer drum 62 is subjected to a force tending to rotate it slightly within a predetermined range. For this reason, the area of the outer surface of the outer peripheral component 76, against which the end of the seal member 77 abuts, is countersunk.

Figure 1:
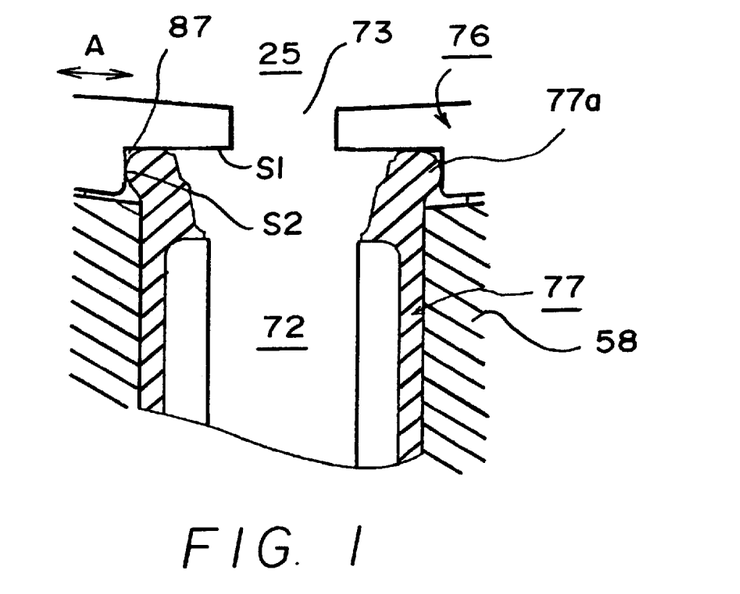
FIG. 1 is an enlarged view of a seal member in a first embodiment of the invention.

FIG. 1 shows the wall 58 of the automatic transmission case 51 (FIG. 4), the oil passage 72 formed in the connecting pipe 71, the outer peripheral component 76 of the outer drum 62, the oil hole 73 formed in the outer peripheral component 76, and the seal member 77. In this case, oil from the valve body 88 is supplied to the oil chamber 25 through the oil passage 72 and the oil hole 73. The outer surface of the outer peripheral component 76 around the oil hole 73 is countersunk to form a recess 87 for receiving the end 77a of the seal member 77. Thus, by reason of the connecting pipe 71 pressing the seal member 77 against the outer peripheral component 76 with a predetermined pressing force, the end 77a of seal member 77 forms a seal with bottom surface S1 of the recess 87.

When, with engagement and disengagement of the second brake B2, the outer drum 62 rotates within a predetermined range in the direction of the arrow A, the end 77a of the seal member 77 is protected by the recess 87 and does not enter the gap between the wall 58 and the outer peripheral component 76, thereby avoiding damage and improving seal quality.

The internal diameter of the recess 87 is made slightly greater than the external diameter of the seal member end 77a. Consequently, when the end 77a expands radially outward as the oil pressure inside the oil passage 72 increases, the inner circumferential surface S2 of the recess 87 and the outer circumferential surface of the end 77a are pressed together further improving seal quality.

Because the end of the connecting pipe 71 is positioned radially outward of the outer surface of the outer drum 62, when the outer drum 62 rotates, with engagement and disengagement of the second brake B2, the seal member 77 is not pinched between the end of the connecting pipe 71 and the outer surface of the outer drum 62. Furthermore, because the end of the connecting pipe 71 is positioned radially outward of the outer surface of the outer drum 62, the volume of the rubber material of the seal member 77 can be increased. As a result, it is possible to prevent splitting of the seal member 77 due to overcompression.

Figure 5:
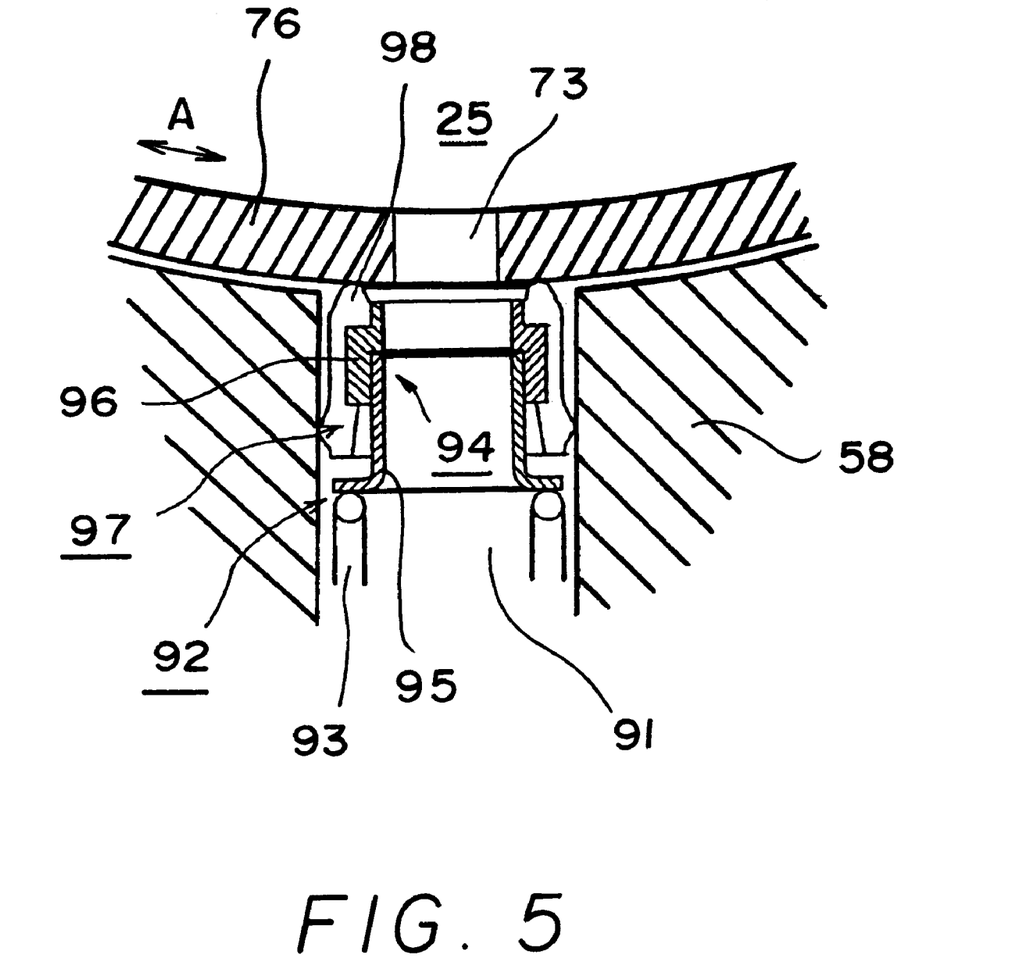
FIG. 5 is a sectional view of a seal member according to a second embodiment of the invention.
Figure 6:
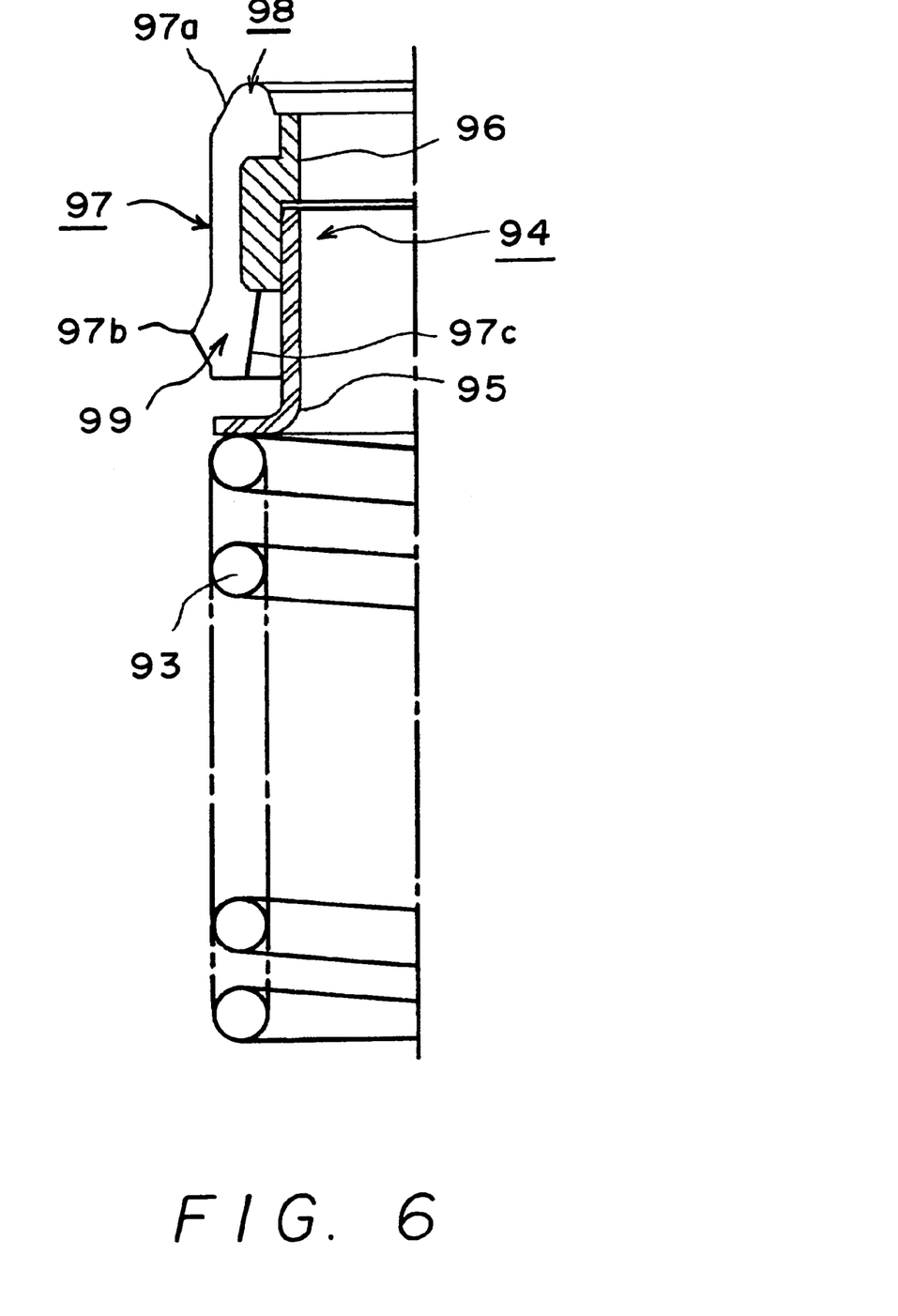
FIG. 6 is an enlarged sectional view of the seal member of the second embodiment.

A second preferred embodiment of the invention is shown in FIGS. 5 and 6 wherein 58 is the wall of the automatic transmission case 51 (FIG. 4), and 91 is an oil passage formed in wall 58. An oil supply unit 92 is disposed with its end facing an oil hole 73 formed in the outer peripheral component 76 of the outer drum 62, and oil from a valve body 88, which is part of a hydraulic control circuit, is supplied into the oil chamber 25 through the oil supply unit 92 and the oil hole 73.

The oil supply unit 92 includes a spring 93 having one end thereof abutting the valve body 88, a gasket holder 94 fixed to the other end of the spring 93, and a cylindrical rubber seal member 97 fixed around the outer circumference of gasket holder 94. The gasket holder 94 is made up of a first cylinder 95 fixed to the spring 93 and a second cylinder 96 fixed to the first cylinder 95 and having the seal member 97 mounted on its outer surface.

The seal member 97 can also be made of nitrile hydride. Since nitrile hydride has stable sliding characteristics at low temperatures it can improve the seal formed by the seal member 97 at low temperatures. In this latter embodiment, because the spring 93 abuts the valve body 88, the spring 93 can be disposed inside the oil passage 91, thus simplifying the construction of the oil seal structure.

The seal member 97 seals the gap between the wall 58 and the outer peripheral component 76 so that oil supplied through the oil passage 91 does not leak from between the connecting pipe 71 and the outer peripheral component 76. The seal member 97 is pressed against the outer peripheral component 76 with a predetermined urging force by the spring 93. In this embodiment, because the urging force of the spring 93 is utilized for sealing, the possibility of splitting of the seal member 97 due to overcompression is reduced. Further, because of utilization of the urging force of the spring for sealing, the elasticity of the seal member can be correspondingly reduced and the allowance for compression can be reduced. Therefore, the seal member can be made of a harder material and its durability can thereby be increased. Furthermore, because the urging force of the spring is stable, the sealing can be better ensured.

A tapered surface 97a is formed on the outside of the end 98 of the seal member 97 and part of the second cylinder 96 is disposed around the inside of this end 98. Therefore, when the outer drum 62 turns within a predetermined range in the direction of arrow A with the seal member 97 pressed against the outer peripheral component 76 by the spring 93, in contrast to use of a large O-ring, because the end 98 is not susceptible to damage by entry into the gap between the wall 58 and the outer peripheral component 76 and suffer damage, the seal is improved. Also, compared to use of a small O-ring, because the volume of the rubber material is larger, it is possible to prevent the occurrence of splitting due to overcompression of the seal member 97.

Because of the tapered surface 97a formed on the exterior of the end of the seal member, the end of the seal member does not greatly deform.

A lip 99 is formed at the end of the seal member 97 opposite end 98, and a seal portion 97b in the form of a convex annulus is formed on the exterior of this lip 99 while a pressure-receiving surface 97c is formed on the inside of the lip 99. As a result, when the oil pressure inside the oil passage 91 acts on the pressure-receiving surface 97c, the lip 99 spreads radially outward and pushes the seal portion 97b against the inner surface of the oil passage 91, the strength of the seal is increased and the oil pressure inside the oil passage 91 is thereby prevented from falling. Furthermore, at the start of hydraulic operation, even at low temperatures, the slidability of the seal member 97 on the inner surface of the oil passage 91 is good, and the movement of the seal member 97 is smooth.

Also, because a compression allowance is provided by extending end 98 to project a predetermined distance from the end of the second cylinder 96, not only can the second cylinder 96 be prevented from biting into the outer peripheral component 76 but also it is possible to prevent the occurrence of splitting due to overcompression of the seal member 97.

The second cylinder 96 constitutes a reinforcing member. Also, because a reinforcing member is disposed around the inner periphery of the seal member at a position a set distance recessed from the end of the seal member, the end of the seal member is more effectively prevented from deforming and it becomes possible both to prevent the reinforcing member from biting into the cylindrical member and also to prevent splitting of the seal member due to overcompression.

Also, because the end of the second cylinder 96 is positioned radially outward of the outer surface of the outer drum 62, when the outer drum 62 turns in the circumferential direction, with engagement and disengagement of the second brake B2, the seal member 97 is not pinched between the end of the second cylinder 96 and the outer surface of the outer peripheral component 76.

Figure 7:
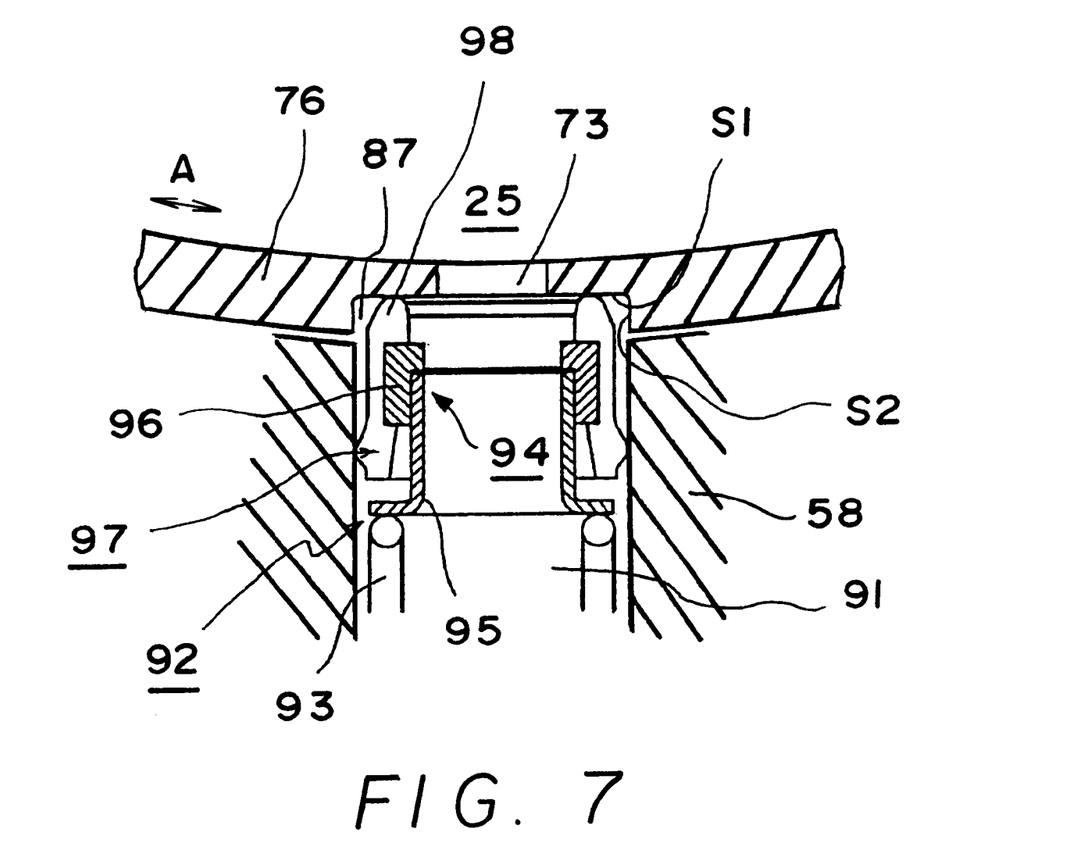
FIG. 7 is a sectional view of a seal member according to a third embodiment of the invention.

FIG. 7 illustrates a third preferred embodiment of the invention. Features and components of this third preferred embodiment the same as corresponding parts of the second preferred embodiment have been given the same reference numerals and will not be further described.

In this third preferred embodiment, the outer surface of the outer peripheral component 76 of the outer drum 62 (FIG. 4) is countersunk around the oil hole 73 to form a recess 87 for receiving the end 98 of the seal member 97.

Therefore, by the seal member 97 being pressed with a predetermined pressing force against the outer peripheral part 76, the end 98 is pressed against the bottom surface S1 of the recess 87 to effect the seal.

When the outer drum 62 turns within a predetermined range, in the direction of the arrow A, with engagement and disengagement of the second brake B2, the end 98 of the seal member 97 is protected by the recess 87 and does not enter the gap between the wall 58 of the automatic transmission case 51 and the outer peripheral component 76.

The internal diameter of the recess 87 is made slightly greater than the external diameter of the end 98 of the seal member 97. As a result, when the end 98 expands radially outward with increase in the oil pressure inside the fluid passage 91, the inner circumferential surface S2 of the recess 87 and the outer circumferential surface of the end 98 are pressed together, thereby enhancing the seal therebetween.

Also, because a compression allowance is provided by the end 98 being made to project a predetermined distance from the end of the second cylinder 96, not only can the second cylinder 96 be prevented from biting into the outer peripheral component 76 but also the likelihood of splitting due to overcompression of the seal member 97 is reduced.

As before, the second cylinder 96 constitutes a reinforcing member. Also, because a reinforcing member is disposed around the inner periphery of the seal member at a position a set distance from the end of the seal member, the end of the seal member is more effectively prevented from deforming and it becomes possible both to prevent the reinforcing member from biting into the cylindrical member and also to prevent splitting of the seal member due to overcompression.

Also, because the end of the second cylinder 96 is positioned radially outward of the outer surface of the outer peripheral component 76, when the outer drum 62 turns upon engagement and disengagement of the second brake B2, the seal member 97 is not pinched between the end of the second cylinder 96 and the outer surface of the outer peripheral component 76.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An oil circuit for an automatic transmission, comprising:

a member with an oil passage therein;

a cylindrical member having an interior oil chamber, said cylindrical member turning, relative to said member with an oil passage, through a predetermined angular range responsive to an exterior force;

an oil hole in said cylindrical member providing fluid communication between said oil passage and said oil chamber;

a recess in said cylindrical member surrounding said oil hole;

a cylindrical seal member having one end inserted within said recess and pressed against said cylindrical member and a second end connected to and sealed with said oil passage whereby said cylindrical seal member forms an oil seal between said cylindrical member and said oil passage; and oil pressure supply means for supplying oil to the oil chamber through said oil passage connecting with said seal member and through said oil hole.

2. An oil circuit according to claim 1, wherein said seal member has an outer circumferential surface and further comprising means of pressing the outer circumferential surface of seal member against an inner circumferential surface of the recess responsive to oil pressure within said seal member.

3. An oil circuit according to claim 2, wherein the cylindrical member is a cylinder drum of a hydraulic servo for engaging and disengaging a frictional engagement element, said oil pressure supplying means is a hydraulic control circuit, said oil passage is formed in an automatic transmission case, and said seal member is mounted within said oil passage and is compressed between said cylinder drum and a connecting pipe also mounted inside oil passage, wherein said exterior force is generated by engagement and disengagement of the frictional engagement element.

4. An oil circuit according to claim 1, wherein the cylindrical member is a cylinder drum of a hydraulic servo for engaging and disengaging a frictional engagement element, said oil pressure supplying means is a hydraulic control circuit, said oil passage is formed in an automatic transmission case, and said seal member is mounted within said oil passage and is compressed between said cylinder drum and a connecting pipe also mounted inside oil passage, and wherein said exterior force is generated by engagement and disengagement of the frictional engagement element.

5. An oil circuit according to claim 1 wherein said member with said oil passage therein is a casing of the automatic transmission.

6. An oil circuit according to claim 1 wherein said second end of said cylindrical seal member is inserted within said oil passage.

7. An oil circuit according to claim 1 wherein said cylindrical seal member comprises an annular elastomeric body.

8. An oil circuit for an automatic transmission, comprising:

a cylindrical member having an interior chamber, said cylindrical member turning through a predetermined angular range response to an exterior force;

an oil hole in said cylindrical member providing fluid communication with oil chamber;

a cylindrical seal member having one end pressed against said cylindrical member, said one end forming an oil seal around said oil hole, said seal member comprising an annular elastomeric body having an exterior tapered surface at said one end and a reinforcing member disposed around an interior surface of the annular elastomeric body at a position recessed from said one end of said seal member; and oil pressure supply means for supplying oil to the oil chamber through said oil hole and an oil passage.

9. An oil circuit according to claim 8, further comprising a spring for biasing said seal member against said cylindrical member.

10. An oil circuit according to claim 9, wherein the oil passage is formed in a wall of a case housing the automatic transmission and wherein said seal member and said spring are mounted within said oil passage.

11. An oil circuit according to claim 9, wherein said elastomeric body comprises a lip portion extending beyond said reinforcing member to an end of said seal member opposite said one end, a seal portion formed as an annular protrusion around an exterior surface of said lip portion and a tapered pressure-receiving surface formed on an interior surface of said lip.

12. An oil circuit according to claim 11, wherein a recess is formed in an exterior surface of said cylindrical member around said oil hole and wherein said one end of said seal member is fitted in said recess to form the oil seal.

13. An oil circuit according to claim 9, wherein said cylindrical member is a cylinder drum of a hydraulic servo for engaging and disengaging a frictional engagement element, wherein said oil pressure supply means is a hydraulic control circuit, wherein said oil passage is formed in a wall of a case housing automatic transmission case and wherein said seal member and said spring are mounted within said oil passage.

14. An oil circuit according to claim 13, wherein a recess is formed in an exterior surface of said cylindrical member around said oil hole and wherein said one end of said seal member is fitted in said recess to form the oil seal.

15. An oil circuit according to claim 14, wherein said reinforcing member is positioned radially outward of said cylinder drum.

16. An oil circuit according to claim 9, wherein a recess is formed in an exterior surface of said cylindrical member around said oil hole and wherein said one end of said seal member is fitted in said recess to form the oil seal.

17. An oil circuit according to claim 8, wherein said elastomeric body comprises a lip portion extending beyond said reinforcing member to an end of said seal member opposite said one end, a seal portion formed as an annular protrusion around an exterior surface of said lip portion and a tapered pressure-receiving surface formed on an interior surface of said lip.

18. An oil circuit according to claim 17, wherein a recess is formed in an exterior surface of said cylindrical member around said oil hole and wherein said one end of said seal member is fitted in said recess to form the oil seal.

19. An oil circuit according to claim 8, wherein a recess is formed in an exterior surface of said cylindrical member around said oil hole and wherein said one end of said seal member is fitted in said recess to form the oil seal.

20. An oil circuit according to claim 19, wherein an exterior surface portion of said seal member located adjacent said tapered surface is pressed against a circumferential surface of the recess by oil pressure inside the oil passage.

* * * * *